(12) United States Patent
Xu (10) Patent No.: US 10,027,889 B2
(45) Date of Patent: Jul. 17, 2018

(54) PORTABLE BATTERY SYSTEMS FOR SPORTS CAMERA

(71) Applicant: Chengdu CK Technology CO., LTD., Chengdu (CN)

(72) Inventor: Wen-cai Xu, Chengdu (CN)

(73) Assignee: Chengdu CK Technology Co., Ltd., Chengdu (CN)

( * ) Notice: Subject to any disclaimer, the term of this patent is extended or adjusted under 35 U.S.C. 154(b) by 88 days.

(21) Appl. No.: 15/163,576

(22) Filed: May 24, 2016

(65) Prior Publication Data
US 2016/0373651 A1     Dec. 22, 2016

(30) Foreign Application Priority Data
Jun. 16, 2015  (CN) .......................... 2015 1 0332183

(51) Int. Cl.
*H02J 7/00*  (2006.01)
*H04N 5/232*  (2006.01)
*H04N 5/225*  (2006.01)
*G03B 17/56*  (2006.01)

(52) U.S. Cl.
CPC ....... *H04N 5/23241* (2013.01); *G03B 17/568* (2013.01); *H02J 7/007* (2013.01); *H02J 7/0021* (2013.01); *H02J 7/0036* (2013.01); *H02J 7/0054* (2013.01); *H04N 5/2252* (2013.01); *G03B 2217/007* (2013.01); *H02J 2007/005* (2013.01); *H02J 2007/0062* (2013.01)

(58) Field of Classification Search
CPC ....... Y02E 60/12; H02J 7/0044; H02J 7/0042; H02J 7/0045; H01M 2/1022
USPC ......................................................... 320/114
See application file for complete search history.

(56) References Cited

U.S. PATENT DOCUMENTS

| | | | | |
|---|---|---|---|---|
| 7,940,312 B2* | 5/2011 | Senda | ................ | H04N 1/00127 348/207.1 |
| 8,736,752 B2* | 5/2014 | Hachisu | .................... | B60R 1/00 348/118 |
| 2002/0005908 A1* | 1/2002 | Taka | .................. | H04N 1/32122 348/372 |
| 2005/0127877 A1* | 6/2005 | Tsuchiya | ............ | G01R 31/3651 320/132 |

(Continued)

*Primary Examiner* — Arun Williams
(74) *Attorney, Agent, or Firm* — Perkins Coie LLP (57) ABSTRACT

The present disclosure is directed to a backup battery device. The backup battery device includes a housing, a power button, two connecting feed points, a charging interface, an indicator, a battery, a processor, and a voltage-converter. One of the two connection feed point is coupled to the indicator and further coupled to the battery. The battery is further coupled to the charging interface and the processor. The processor is coupled to the voltage-converter. The backup battery device further includes a manual button. When a user wants to charge a camera (which has two camera feed points corresponding to the two connecting feed point), the user connects the camera feed points with the connecting feed points and then presses the manual button. The processor then controls the charging process by enabling the battery to provide power to the camera. After sufficient amount of electricity has been transferred to the camera, the charging process can be stopped so as to protect the camera. When the battery has insufficient electricity, it can be recharged via the charging interface.

18 Claims, 5 Drawing Sheets

(56) References Cited

U.S. PATENT DOCUMENTS

| | | | |
|---|---|---|---|
| 2010/0001693 A1* | 1/2010 | Iida | G01R 31/3679 320/134 |
| 2010/0201321 A1* | 8/2010 | Asakura | G01R 31/025 320/132 |
| 2012/0306450 A1* | 12/2012 | Nakayama | G06F 1/263 320/134 |

* cited by examiner

PORTABLE BATTERY SYSTEMS FOR SPORTS CAMERA

CROSS-REFERENCE TO RELATED APPLICATIONS

This application claims the benefit of Chinese Patent Application No. 2015103321831, filed Jun. 16, 2015 and entitled "A BACKUP BATTERY DEVICE FOR OUTDOOR SPORTS CAMERA" the contents of which are hereby incorporated by reference in its entirety.

BACKGROUND

Sports cameras are popularly used for capturing images in various events. Due to recent demands for higher image qualities, sports cameras nowadays generally consume more power than those in the past. Requiring more power usually results in a larger battery size, which is undesirable to modern users. Traditionally, a user needed to bring a backup battery and frequently swap a drained battery with the backup battery. It is inconvenient to the user because the user needs to shut down the camera system before swapping batteries, perhaps even during an important image-collection operation (e.g., the birth of a child). Therefore, it is advantageous to have an improved method or system that can provide supplemental battery power without interrupting normal operations of a sports camera.

BRIEF DESCRIPTION OF THE DRAWINGS

Embodiments of the disclosed technology will be described and explained through the use of the accompanying drawings.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiment", "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure relates to a portable battery apparatus that can be coupled to a sports camera and provide power/electricity thereto. The portable battery apparatus is compact, easy-to-assemble, and convenient-to use. The portable battery apparatus includes a housing structure that is compatibly formed to mate with the sports camera. For example, the housing structure can have a length and a width the same as those of the sports camera, such that the housing structure can be closely attached to the housing structure without significantly interfering with the camera's routine operation.

The portable battery apparatus in the present disclosure includes feed connecting points that can be directly coupled or interface to corresponding contact points of a sports camera, without requiring additional wires, cables, or connectors. It is convenient to a user of the sports camera because the user need not carry such additional items.

The present disclosure also provides a backup battery system that enables a user to continue operating a mobile device (e.g., a sports camera) when the mobile device is running out of power. Thus, the "hot swappable" backup battery system enables the user to attach it to the mobile device, without requiring the user to shut down the mobile device. For example, when a user uses a sports camera to film an important game and finds that the sports camera is going to run out of power, he/she can quickly attach the backup battery system to the sports camera. The system will automatically detect the form (e.g., working voltage, working current, etc.) of the power needed by the sports camera and then supply it to the sports camera accordingly. It is advantageous to have such an "on-the-fly" battery system especially when performing tasks that require relatively long time.

The backup battery system in the present disclosure can include one or more specifically-designed spacers positioned between the system and a mobile device coupled to the system. For example, the mobile device can be a sports camera with a large display (e.g., an LCD display) and the spacers can be plastic pads configured to absorb abrupt impacts/shocks. The spacers can be positioned between the system and the display of the sports camera such that the system does not damage the display when operating.

The backup battery system in the present disclosure can include a battery component, a charging control component configured to control a charging process, and a monitoring component configured to monitor a status of the battery component. In some embodiments, the charging control component can initiate the charging process in response to a predetermined event (e.g., receive a signal indicating that the system is coupled to a sports camera) and terminate the charging process in response to another predetermined event (e.g., a determination that a power level of the battery component is lower than a threshold value). In some embodiments, the charging control component and the monitoring component can be integrated in one chip available from a variety of manufacturers such as Monolithic Power Systems, Inc. of San Jose, Calif. For example, the charging control component can include a voltage-booster circuit so as to adjust a voltage of the electricity supplied by (or needed by) the system. The monitoring component can include a current-detecting circuit configured to detect the current of the electricity supplied by the system (e.g., so as to determine how much electricity left in the battery component). In some embodiments, the voltage-booster circuit and the current-detecting circuit can be integrated in one voltage-booster chip.

Figure 1A:
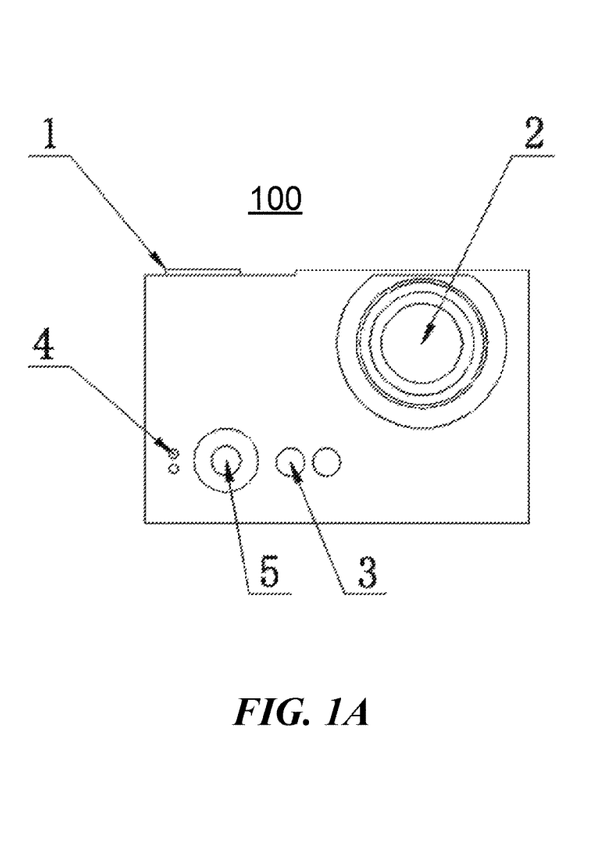
FIGS. 1A and 1B are side views of a sports camera that can be coupled to apparatuses or systems in accordance with embodiments of the disclosed technology.
Figure 1B:
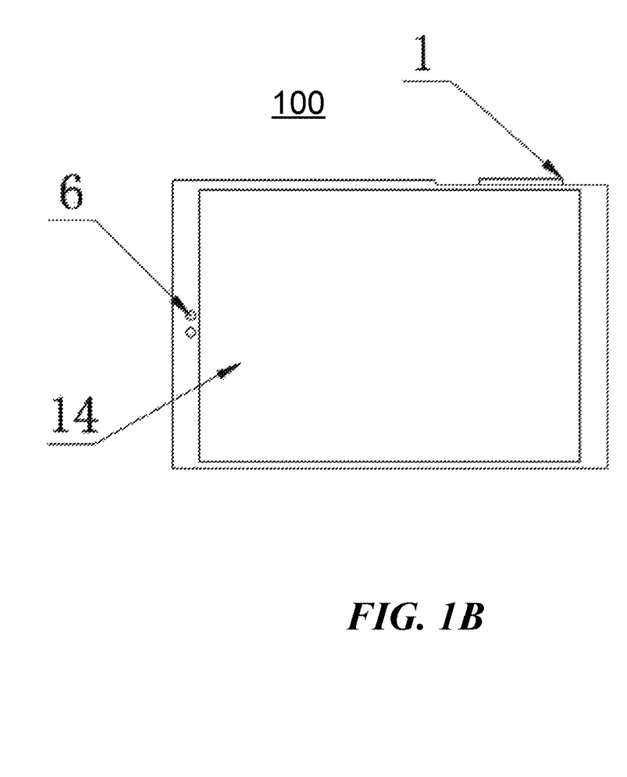

FIGS. 1A and 1B are side views of a sports camera 100 that can be coupled to portable battery apparatuses (or backup battery systems) in accordance with embodiments of the disclosed technology. FIG. 1A is the front view and FIG. 1B is the back view. As shown in FIG. 1A, the sports camera 100 includes a camera shutter button 1, a camera lens 2, one or more camera indicators 3, one or more camera feed points 4, and a camera power switch 5. The camera shutter button 1 is configured to initiate a process of collecting images by the camera lens 2. The camera indicator 3 is configured to show a status of the camera 100 (e.g., power is on or off). The camera power switch 5 is configured to turn on or off the camera 100. The camera feed point 4 is configured to couple to an external antenna (not shown). As shown in FIG. 1B, the camera 100 further includes one or more contacting points 6 and a display 14 configured to present collected images. The contacting points 6 are configured to be coupled to portable battery apparatuses (or backup battery systems) in accordance with the present disclosure, as discussed in detail below.

Figure 2A:
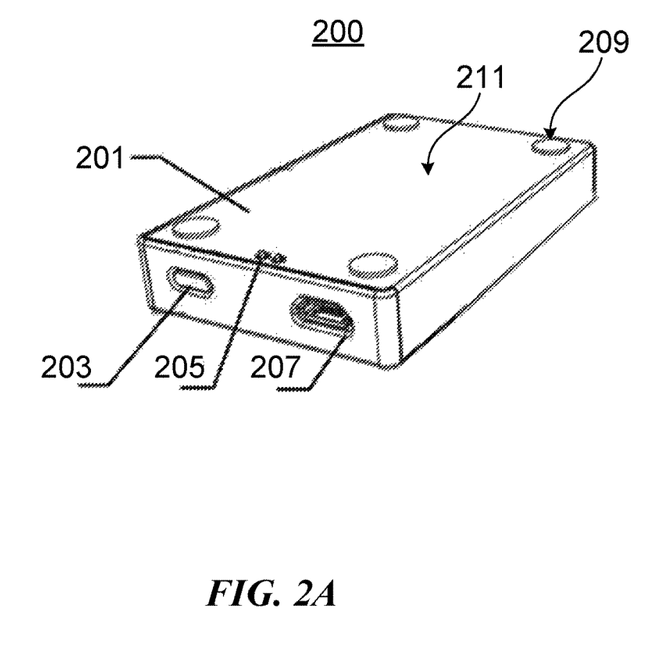
FIGS. 2A and 2B are schematic, isometric diagrams illustrating a portable battery apparatus in accordance with embodiments of the disclosed technology.
Figure 2B:
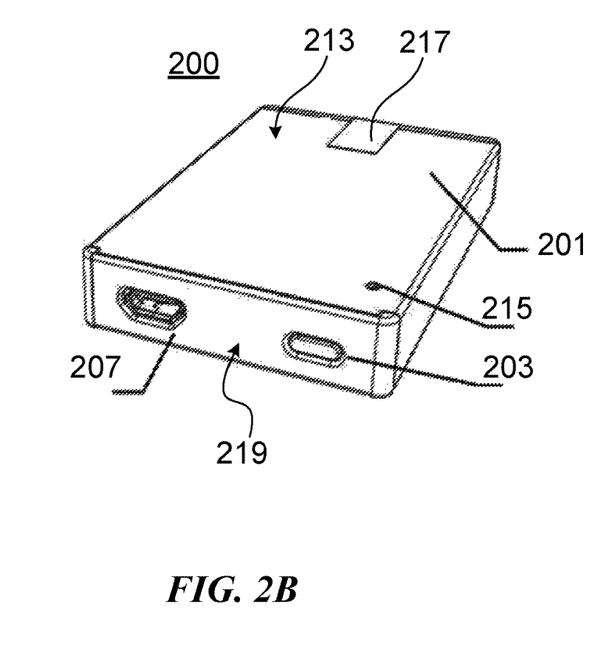

FIGS. 2A and 2B are schematic, isometric diagrams illustrating a portable battery apparatus 200 in accordance with embodiments of the disclosed technology. As shown in FIG. 2A, the portable battery apparatus 200 includes a housing 201, a power button 203, two feed connecting points 205, a recharging interface 207, and multiple spacers 209 positioned on a first surface 211 of the portable battery apparatus 200. In the illustrated embodiment, the housing 201 is formed in accordance with the shape of the sports camera 100 shown in FIGS. 1A and 1B. For example, the housing 201 has substantially the same length and width as the sports camera 100. The feed connecting points 205 positioned on the first surface 211 are configured to be coupled to the contacting points 6 of the sports camera 100 (shown in FIGS. 1A and 1B).

When a user wants to connect the portable battery apparatus 200 with the sports camera 100, he/she can first hold the portable battery apparatus 200 with the first surface 211 facing the display 14 of the sports camera 100, and then let the feed connecting points 205 be electrically coupled to the corresponding contact points 6. In the illustrated embodiments, the spacers 209 can be positioned between the portable battery apparatus 200 and the sports camera 100 so as to prevent the display 14 from damages caused by contacting the portable battery apparatus 200. In the illustrated embodiments, the spacers 209 are positioned at the four corners of the portable battery apparatus 200. In other embodiments, the spacers 209 can be positioned at different locations (e.g., to protect a weak spot of the display 14). In the illustrated embodiment, the spacer 209 has a cylindrical shape. In other embodiments, the spacer 209 can be formed in different shapes (e.g., cuboids, stripes, etc.). In some embodiments, the spacer 209 can be made of plastic or rubber. The spacer 209 may further comprise magnetic material, configured to magnetically attach to the sports camera 100. Thus the user could continue holding and operating the sports camera 100 when the portable battery apparatus 200 is charging the sports camera 100. In some embodiments, the portable battery apparatus 200 and the sports camera 100 can be attached by a suitable mechanism such as a latch, clip, or snap component (not shown).

Once the portable battery apparatus 200 is coupled to a mobile device (e.g., the sports camera 100), the power button 203 is configured to enable a user to initiate or terminate a charging process by pressing it. The recharging interface 207 is configured to recharge a battery component (now shown in FIG. 2A) of the portable battery apparatus 200. In the illustrated embodiment, the recharging interface 207 is a USB interface. To provide electricity to the battery component of the portable battery apparatus 200, a user can couple the recharging interface 207 to a power source (e.g., a wall receptacle) via a USB cable. In other embodiments, the recharging interface 207 can be other suitable types of connectors or applicable interfaces.

As shown in FIG. 2B, the portable battery apparatus 200 includes an indicator 215 positioned on a second surface 213 of the housing 201. The indicator 215 is configured to visually present a status of the portable battery apparatus 200. For example, the indicator 215 can emit green light signals when the battery component of the portable battery apparatus 200 has a power level higher than and equal to 50% of its full capacity. The indicator 215 can emit red light signals when the battery component of the portable battery apparatus 200 has a power level lower than 50% of its full capacity.

As shown in FIG. 2B, the portable battery apparatus 200 includes a gripping component 217 positioned on the second surface 213 of the housing 201. The gripping component 217 is configured to provide more gripping force to a user of the portable battery apparatus 200. For example, the gripping component 217 can have a relatively rough surface such that it can provide more friction when the user contacts the gripping component 217.

As shown in FIG. 2B, the recharging interface 207 is positioned on a third surface 219 substantially perpendicular to the first surface 211 and the second surface 213. This arrangement enables a user to use the portable battery apparatus 200 to provide electricity to the camera 100 while recharging the battery company of the portable battery apparatus 200.

Figure 3:
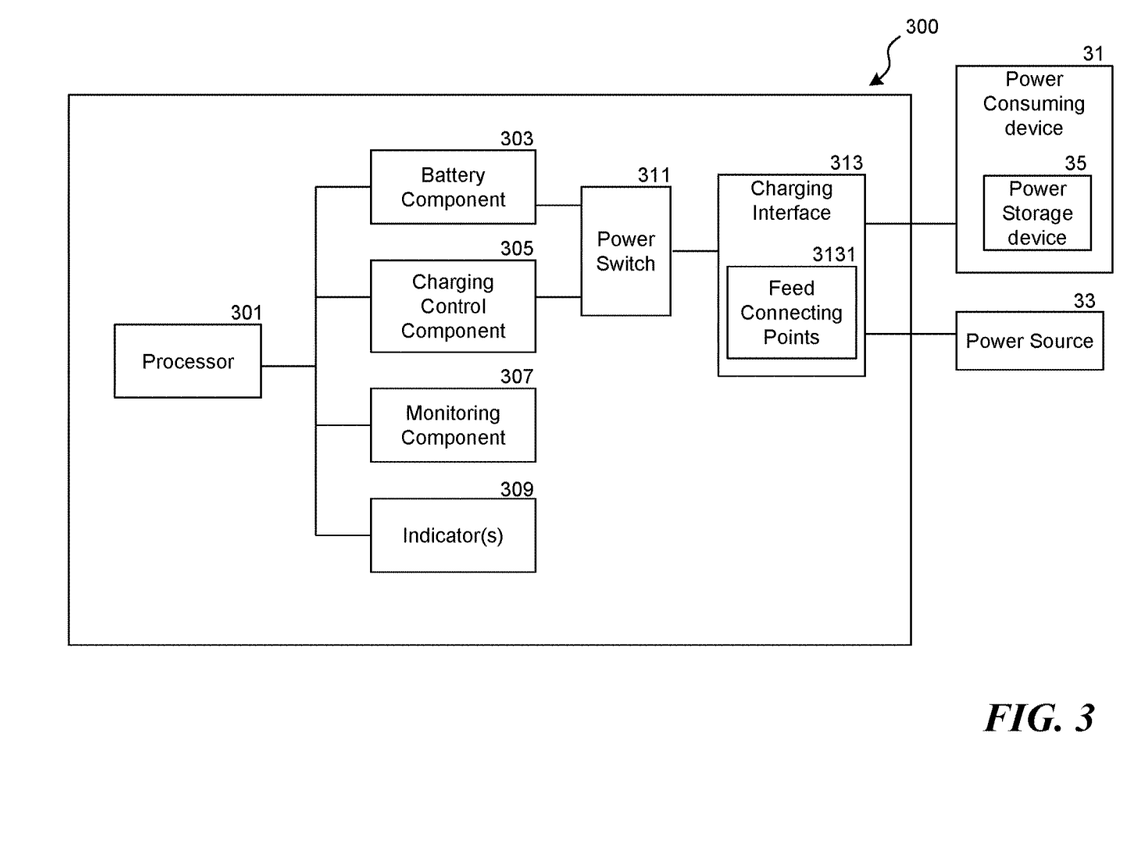
FIG. 3 is a schematic diagram illustrating a system in accordance with embodiments of the disclosed technology.

FIG. 3 is a schematic diagram illustrating a backup battery system 300 in accordance with embodiments of the disclosed technology. The system 300 includes a processor 301, a battery component 303, a charging control component 305, a monitoring component 307, an indicator 309, a power switch 311, and a charging interface 313 having multiple feed connecting points 3131. The system 300 can be operably coupled to a power consuming device 31 having a power storage device 35. In a charging process, the system 300 can provide electricity to the power storage device 35 via the feed connecting points 3131. In a recharging process, the power source 33 can provide electricity to the battery component 303 via the charging interface 313.

The processor 301 is configured to control other components of the system 300. The battery component 303 is configured to store electricity. A shown, the battery component 303 is coupled to the power consuming device 31 or the power source via the power switch 31 and the charging interface 313. In some embodiments, the battery component 303 can be a lithium-ion battery. In other embodiments, the battery component 303 can be another type of rechargeable battery.

The monitoring component 307 is configured to monitor a status of the battery component 303. For example, the monitoring component 307 can monitor a power level of the battery component 303. In some embodiments, the monitoring component 307 can include a current sensor (or a circuit) that can measure the electrical current coming out from the battery component 303. In some embodiments, the monitoring component 307 can detect whether the battery component 303 is properly coupled to the power consuming device 31 or the power source 33.

The indicator 309 is configured to present the status of the battery component 303 to a user. In some embodiments, the indicator 309 can be a light emitter. In other embodiments, the indicator 309 can be an audio device such as a speaker. The indicator 309 can keep the user updated of the current status of the battery component 303, such that the user can decide to initiate, continue, or terminate a charging or recharging process performed by the system 300. When the user wants to initiate or terminate the charging or recharging process, he/she can instruct the system 300 by pressing a power button (e.g., the power button 203 shown in FIGS. 2A and 2B), and then the system 300 can accordingly turn on or turn off the power switch 311 to implement the user's instruction.

The charging control component 305 is configured to control the charging or recharging process of the system 300 by turning on or turning off the power switch 311. In some embodiments, the power switch 311 can be a switch coupled to a manual button. The manual button enables a user to manually control (e.g., initial or terminate) the charging/recharging process by pressing it. In some embodiments, the charging control component 305 comprises a switch mode power supply, e.g., a boost converter or a voltage converter. The charging control component 305 is configured to initiate a charging process after finding that the power consuming device 31 is coupled to the system 300 (e.g., this can be detected by the monitoring component 307). In some embodiments, the charging control component 305 can terminate an existing charging process when the system 300 determines that the power level of the battery component 303 is too low (e.g., 20% of the full capacity; this can also be detected by the monitoring component 307). Similarly, the charging control component 305 can initiate a recharging process after finding that the power source 33 is coupled to the system 300. Also, the charging control component 305 can terminate an existing recharging process when the system 300 determines that the power level of the battery component 303 is above a certain level (e.g., 99% of the full capacity).

Figure 4:
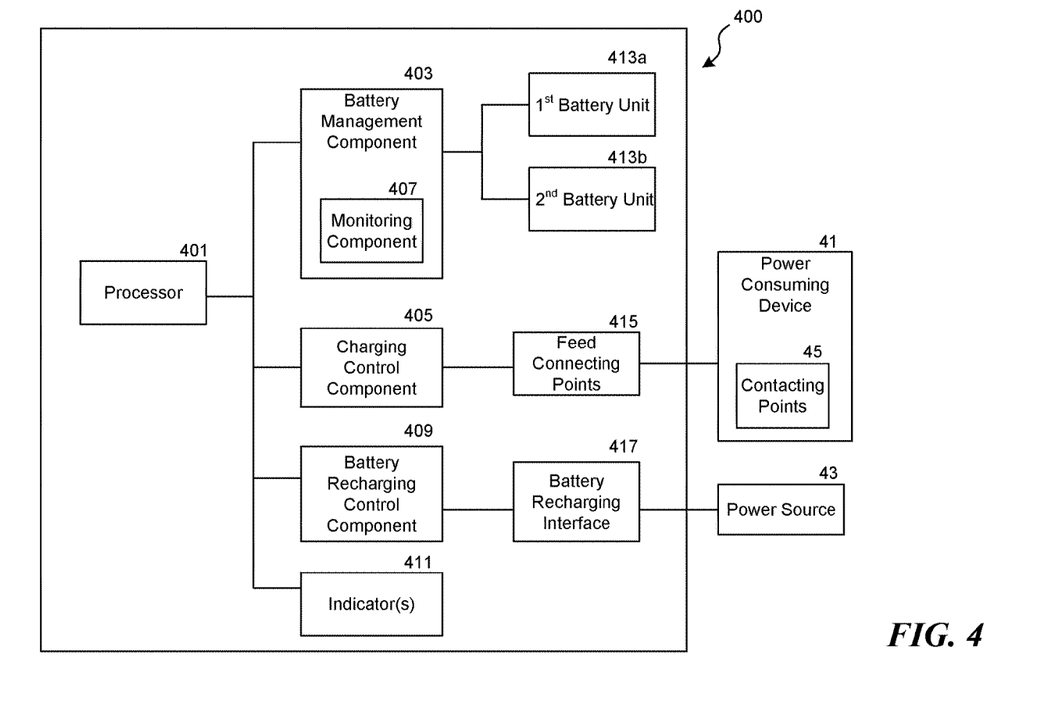
FIG. 4 is a schematic diagram illustrating a system in accordance with embodiments of the disclosed technology.

FIG. 4 is a schematic diagram illustrating a backup battery system 400 in accordance with embodiments of the disclosed technology. The system 400 includes a processor 401, a battery management component 403, a charging control component 405, a battery recharging control component 409, an indicator 411, first and second battery units 413a and 413b, multiple feed connecting points 415, and a battery recharging interface 417. The system 400 can be operably coupled to a power consuming device 41 having multiple contacting points 45. The contacting points 45 are coupled to the corresponding feed connecting points 415. In a charging process, the system 400 can provide electricity to the power consuming device 41 via the feed connecting points 415. The system 400 can be operably coupled to a power source 43 via the battery recharging interface 417. In a recharging process, the power source 43 can provide electricity to the first battery unit 413a and/or the second battery unit 413b via the battery recharging interface 417. The processor 401 is configured to control other components of the system 400.

The battery management component 403 is coupled to the first battery unit 413a and the second battery unit 413b and configured to manage electricity stored in the system 400. For example, the battery management component 403 can monitor the statuses of the first and second battery units 413a, 413b and determine how to employ the first and second battery units 413a, 413b. For example, in a charging process, the battery management component 403 can determine which battery unit has more electricity left and then choose that battery unit to supply electricity first. As another example, in a recharging process, the battery management component 403 can determine which battery unit has less electricity left and then choose that battery unit to be recharged first.

The battery management component 403 can further include a monitoring component 407 configured to monitor the statuses of the first and second battery units 413a and 413b. In some embodiments, the monitoring component 407 can monitor power levels of the first and second battery units 413a and 413b. In some embodiments, the monitoring component 407 can include a sensor (or a circuit) that can measure the electrical current coming out from the first battery unit 413a or the second battery unit 413b. In some embodiments, the monitoring component 407 can detect whether the first and second battery units 413a and 413b are properly connected. In some embodiments, the first and second battery units 413a and 413b can be lithium-ion batteries. In other embodiments, the first and second battery units 413a and 413b can be other types of rechargeable batteries.

The indicator 411 is configured to present the statuses of the first and second battery units 413a, 413b to a user. In some embodiments, the indicator 411 can be a light emitter. In other embodiments, the indicator 411 can be an audio device such as a speaker. The indicator 411 can keep the user updated of the current statuses of the first and second battery units 413a, 413b, such that the user can decide to initiate, continue, or terminate a charging or recharging process performed by the system 400.

The charging control component 405 is configured to control the charging process of the system 400. As shown, the charging control component 405 is coupled to the power consuming device 41 via the feed connecting points 415. In some embodiments, the charging control component 405 can initiate the charging process after finding that the power consuming device 41 is coupled to the system 400. In some embodiments, the charging control component 405 can terminate an existing charging process when the system 400 determines that the power levels of the first and second battery units 413a, 413b are too low (e.g., 20% of the full capacity; this can be detected by the monitoring component 407).

The battery recharging control component 409 is configured to control the recharging process of the system 400. As shown, the battery recharging control component 409 is coupled to the power source 43 via the battery recharging interface. The battery recharging control component 409 can initiate the recharging process after finding that the power source 43 is coupled to the system 400. Also, the battery recharging control component 409 can terminate an existing recharging process when the system 400 determines that the power levels of the first and second battery units 413a, 413b are above a certain level (e.g., 99% of the full capacity).

Figure 5:
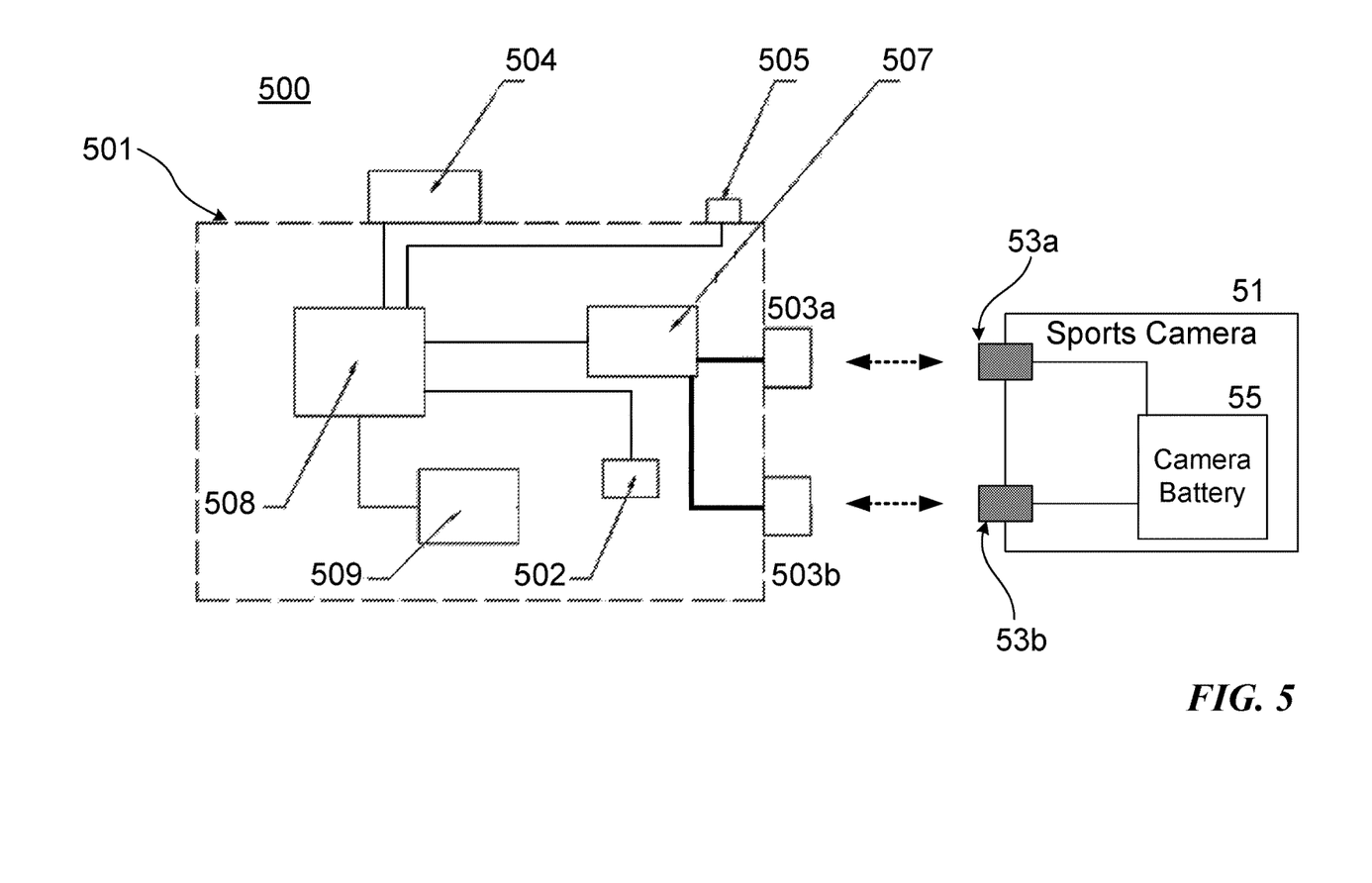
FIG. 5 is a schematic diagram illustrating a system in accordance with embodiments of the disclosed technology.

FIG. 5 is a schematic diagram illustrating a backup battery system 500 in accordance with embodiments of the disclosed technology. The system 500 is configured to provide electricity to a sports camera 51. As shown, the sports camera 51 includes two contacting points 53a, 53b. The system 500 includes a housing 501, a manual switch 502, two feed connecting points 503a, 503b, a recharging interface 504, an indicator 505, a battery 507, a processor 508, and a voltage converter 509. The housing 501 is configured to accommodate other components of the system 500. The processor 508 is configured to control other components of the system 500. The feed connecting points 503a, 503b are positioned on the housing 501 and configured to be in contact with the corresponding contact points 53a, 53b of the sports camera 51 during a charging process. The indicator 505 is configured to show a status of the system 500 (e.g., e.g., remaining electricity of the battery 507). The battery 507 is configured to store electricity in the system 500. The recharging interface 504 is positioned on the housing 501 and configured to be coupled to a power source when recharging the battery 507.

The voltage converter 509 is configured to adjust a voltage of the electricity in the system 500. For example, the battery 507 can have a first working voltage (e.g., 3.7V) and the recharging interface 504 can have a second working voltage (e.g., 4.40-5.25V). In a recharging process, the voltage converter 509 can adjust the voltage of the electricity passing through the recharging interface 504 (e.g., from the power source) from the second working voltage to the first working voltage such that the battery 507 can be properly recharged. In other embodiments, the voltage-booster chip 509 can adjust the voltage of outgoing electricity from the battery 507 to another working voltage required by an external device (e.g., an external connector/interface or an external battery).

In some embodiments, the voltage converter 509 can be coupled to a voltage-detecting circuit that is configured to detect a voltage in the system 500. In some embodiments, the voltage converter 509 can be coupled to a current-detecting circuit that is configured to detect an electrical current in the system 500. The detected voltage or current can be used to determine a remaining electricity level of the battery 307. In some embodiments, the manual switch 502 can be a switch circuit enabling a user to control the charging/recharging processes. In some embodiments, the manual switch 502 can be coupled to a manual button (e.g., the power button 203 shown in FIGS. 2A and 2B) positioned on the housing 501. The manual button enables a user to manually initiate or terminate a charging process.

As shown in FIG. 5, during a charging process, the battery 507 of the system 500 and the camera battery 55 are in a closed circuit loop such that the battery 507 can provide electricity to the camera battery 55. More particularly, the battery 507 is coupled to the camera battery 55 via the feed connecting point 503a, and the contact point 53a. Further, the camera battery 55 is coupled to the battery 507 via the contacting point 53b and the feed connecting point 503b. By using the closed circuit loop design, the system 500 is easy-to-manufacture and safe (e.g., when one of the components in the loop does not function normally, an existing charging process of the system 500 would be automatically terminated.)

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A system for providing electrical energy to a mobile device, comprising:
  a processor;
  a housing configured to accommodate the processor;
  a battery component coupled to the processor and configured to store electrical energy;
  a charging control component coupled to the processor and configured to initiate a charging process and stop the charging process;
  a monitoring component coupled to the processor and configured to determine a status of the battery component, wherein the monitoring component generates a stop signal in an event that the electrical energy of the battery component is lower than a predetermined threshold value, and wherein the stop signal is transmitted to the charging control component;
  an indicator coupled to the processor and configured to visually present the status of the battery component;
  a charging interface coupled to the charging control component and configured to transmit the electrical energy from the battery component to the mobile device during the charging process, wherein the charging interface include a feed connecting point positioned on an edge of the housing;
  a spacer on the housing and operably positioned between the housing and the mobile device; and
  two feed connecting points coupled to the charging control component;
  wherein the charging control component stops the charging process upon receiving the stop signal;
  wherein the spacer and the two feed connecting points are positioned on a first surface of the housing;
  wherein the indicator is positioned on a second surface of the housing; and
  wherein the first surface is opposite to the second surface.

2. The system of claim 1, further comprising a manual switch coupled to the charging control component, wherein the manual switch enables a user to manually control the charging process.

3. The system of claim 1, wherein the feed connecting point is configured to couple to a power storage unit of the mobile device.

4. The system of claim 1, wherein the charging interface includes a universal serial bus connector (USB) configured to couple to a power source.

5. The system of claim 1, wherein the feed connecting point is coupled to the charging control component and configured to generate a start signal indicating that the mobile device is coupled to the battery component.

6. The system of claim 5, wherein the start signal is transmitted to the charging control component, and wherein the charging control component initiates the charging process upon receiving the start signal.

7. The system of claim 1, wherein the charging control component includes a voltage-converting circuit.

8. The system of claim 1, wherein the monitoring component includes a current sensing circuit.

9. The system of claim 1, wherein the monitoring component includes a voltage sensing circuit.

10. The system of claim 1, wherein the housing accommodates the battery component, the charging control component, and the monitoring component.

11. The system of claim 1, further comprising a manual button at least coupled to one of the feed connecting points and positioned on a third surface of the housing, wherein the third surface is substantially perpendicular to the first surface.

12. The system of claim 1, wherein the spacer is a magnetic spacer configured to magnetically attach to the mobile device.

13. A portable apparatus for providing electrical energy to a sports camera, the sports camera having a contacting point, the apparatus comprising:

a processor;

a housing configured to accommodate the processor;

a battery component coupled to the processor and configured to store electrical energy;

a voltage-converting component coupled to the processor and configured to determine a status of the battery component, to adjust a form of the electrical energy of the battery component, to initiate an energy transfer process, and to stop the energy transfer process, wherein the status of the battery component is indicative of a current power level of the battery component;

an indicator coupled to the processor and configured to visually present the status of the battery component; and a feed connecting point coupled to the battery component and operably coupleable to the contacting point of the sports camera, wherein the battery component provides electrical energy to the sports camera through the feed connecting point and the contacting point during the energy transfer process, and wherein the energy transfer process is initiated when the feed connecting point is coupled to the contacting point; and a manual switch configured to stop the energy transfer process when the current power level of the battery component is lower than a predetermined threshold value; and a spacer on the housing and operably positioned between the housing and the sports camera;

wherein the spacer and the feed connecting point are positioned on a first surface of the housing;

wherein the indicator is positioned on a second surface of the housing; and wherein the first surface is opposite to the second surface.

14. The apparatus of claim 13, further comprising a charging interface coupled to the battery component and configured to receive electrical power from a power source to the battery component during a recharging process.

15. The apparatus of claim 14, wherein the predetermined threshold value is a first predetermined threshold value, and wherein the recharging process is initiated when the current power level of the battery component is lower than a second predetermined threshold value.

16. The apparatus of claim 13, wherein the voltage-converting component includes a voltage-converting circuit configured to adjust a voltage of the electrical energy from the battery component before transferring the electrical energy to the sports camera.

17. The apparatus of claim 13, wherein the voltage-converting component is integrated in an integrated chip.

18. A portable system for managing electricity, comprising:

a processor;

a battery management component coupled to the processor;

multiple batteries coupled to the battery management component, wherein the battery management component is configured to determine an overall power status of the batteries;

a charging control component coupled to the processor and configured to initiate a charging process and to stop the charging process;

an indicator coupled to the processor and configured to visually present the overall power status of the batteries;

a feed connecting point coupled to the battery management component and configured to transfer electrical energy from the batteries to an external device during the charging process;

a housing to enclose the system; and a spacer on the housing the operably positioned between the housing and the external device;

wherein the charging process is initiated when the charging interface detects that the external device is coupled to the charging control component;

wherein the charging process is terminated when the charging control component detects an electrical current signal that indicates the overall status of the batteries is lower than a predetermined threshold value;

wherein and spacer and the two feed connecting points are positioned on a first surface of the housing;

wherein the indicator is positioned on a second surface of the housing; and wherein the first surface is opposite to the second surface.

* * * * *